United States Patent [19]
Williams

[11] Patent Number: 6,069,844
[45] Date of Patent: May 30, 2000

[54] ACOUSTIC ANNUNCIATOR FOR AUDIO TRACKING COLLARS

[75] Inventor: Matthew R. Williams, Fort Wayne, Ind.

[73] Assignee: Innotek Pet Products, Inc., Garrett, Ind.

[21] Appl. No.: 09/098,727

[22] Filed: Jun. 17, 1998

[51] Int. Cl.$^7$ .................................................. H04R 1/00
[52] U.S. Cl. ...................... 367/139; 381/340; 181/152
[58] Field of Search ...................... 367/163, 174, 367/165, 173, 188, 176, 162, 139; 116/137 R; 119/719, 908; 381/190, 338, 340, 341, 342, FOR 143; 181/149, 159, 160, 152, 178, 182, 186, 197

[56] References Cited

U.S. PATENT DOCUMENTS

| | | | |
|---|---|---|---|
| 2,942,071 | 6/1960 | Witchey | 381/340 |
| 3,733,530 | 5/1973 | Labart et al. | |
| 3,970,879 | 7/1976 | Kumon | 310/324 |
| 4,183,017 | 1/1980 | Sims | 340/384.7 |
| 4,234,876 | 11/1980 | Murai | |
| 4,399,432 | 8/1983 | Lunn | |
| 4,876,674 | 10/1989 | Parmely et al. | |
| 5,465,687 | 11/1995 | Custer | |
| 5,726,396 | 3/1998 | Erath | 181/152 |

*Primary Examiner*—Ian J. Lobo
*Attorney, Agent, or Firm*—Taylor & Aust, P.C.

[57] ABSTRACT

An acoustic annunciator which includes resonating cavity, a piezoelectric element, and a folded horn which are each selected to have a different resonance frequency so as to expand the frequency range of the output of the annunciator. The folded horn includes a cone defined by a main body portion and an outer horn which is rotatable and axially displaceable with respect to the main body portion. The outer horn is designed to rotate to prevent the annunciator from being snagged or caught by objects. The outer horn is designed to be axially displaceable in order to access and remove debris from inside the annunciator. In addition, the acoustic annunciator includes a driver that faces downward during use. This orientation of the driver allows for drainage while preventing the ingress of rain and/or snow.

20 Claims, 4 Drawing Sheets

ACOUSTIC ANNUNCIATOR FOR AUDIO TRACKING COLLARS

TECHNICAL FIELD

The present invention relates to collar mounted audio signaling devices which are used to locate or track animals. More particularly, the present invention is directed to annunciators for collar mounted audio signaling devices.

BACKGROUND OF THE INVENTION

Audio tracking collars have been used by hunters for many years to locate hunting dogs in situations in which visual identification of dogs is impaired by foliage, physical distance, inclement weather, etc. Audio tracking collars generally emit a high amplitude audio signal which provides directional information associated with an animal's location. Typical audio tracking collars produce an audio signal in the range of 2000 Hertz and above with approximately a 100 decibel minimum sound pressure level at 30 centimeters from the annunciator. The audio signal may be modulated or swept in frequency in order to provide a unique signal that can be used to discern one dog from another in situations herein multiple dogs are ranging, or to provide information about the behavior of a dog in such instances wherein the dog has treed a prey or has stopped moving or assumed a pointing stance.

Typical audio tracking collars use annunciating devices which comprise low cost piezoelectric elements that transduce an applied electric signal into an acoustically emitted signal. Such piezoelectric transducer systems offer limited functioning capability due to inherent design limitations. For example, such piezoelectric transducer systems tend to be resonate over a very narrow frequency range. Although such systems provide acceptable acoustic signal amplitude over their limited frequency ranges, these frequency range limitations restrict the complexity of signal modulation that the annunciators are capable of producing. Thus, these systems are limited in their ability to produce different discernable audio signals.

A number of prior art audio tracking collars have their annunciating elements mounted in such a manner that, when worn by an animal, the opening through which the audio signal emanates is pointed upwards. In such a configuration, rain and/or snow tends to fill the annunciator through the opening, resulting in a reduction in the amplitude of the audio signal. Debris such as brush and plant materials present in many outdoor sites can also obscure the opening and, if carried by water flow into the interior recesses of the annunciator, is virtually impossible to remove. Dogs that swim while wearing audio tracking collars cause the annunciators to fill with water and dissolved sediments.

The present invention provides acoustic annunciators for collar mounted audio signal devices which have frequency ranges that can be modulated and which are designed for rough field service.

DISCLOSURE OF THE INVENTION

In addition to further objects, characteristics and features of the present invention which will become apparent as the description thereof proceeds below, the present invention provides an acoustic annunciator which includes:
   a housing;
   a piezoelectric element supported in the housing; and
   an outer horn member which surrounds a portion of the housing and is movable with respect to the housing.

The present invention further provides a collar mounted acoustic annunciator which includes a housing and a piezoelectric element supported in the housing, and the improvement which comprises coaxial housing elements which define a folded horn wherein one of the coaxial housing elements is rotatable and translatable with respect to another one.

BRIEF DESCRIPTION OF THE INVENTION

The present invention will be described hereafter with reference to the attached drawings which are given as non-limiting examples only, in which.

BEST MODE FOR CARRYING OUT THE INVENTION

The present invention is directed to collar mounted audio signal devices which are used to locate or track animals. More particularly, the present invention is directed to acoustic annunciators for collar mounted audio signal devices. The acoustic annunciators of the present invention are designed for field use in environments which can cause various types of debris to enter and foul the annunciators. For example, the drivers of the annunciators have openings which face downward and thereby prevent ingress of water and debris by gravitational forces. In addition, the annunciators can be provided with drainage openings which allow water to be removed by gravitational forces.

The annunciators of the present invention can further include structural components that can be manipulated to prevent snagging or catching thereof by brush, branches and other objects. In addition, the annunciators can include structural components that can be manipulated to assist in removing debris from the annunciators.

The annunciators of the present invention include piezoelectric elements and horn structures which produce acoustic outputs that have a wide frequency range which can be modulated or swept to produce different distinguishable acoustic signals that can be used to differentiate between different animals and/or different animal behavior patterns.

The annunciators of the present invention include base portions by which they can be mounted to a collar or other structure. The base portions include electrical connectors by which the annunciators can be electrically coupled to a suitable driving circuit. Suitable driving circuits include those typically used in conjunction with animal training and tracking devices.

The annunciators of the present invention further include main body portions which support the piezoelectric elements and define resonating chambers. The main body portions further define a portion of the effective acoustic horn. In addition to the base and main body portions, the annunciators of the present invention include outer horn members. The main body portions and the outer horn members together form folded horns which direct acoustic signals generated in the resonating cavities through a serpentine route in the annunciators. This provides a compact annunciator design that emits an acoustic signal that has a wide frequency range.

Figure 1:
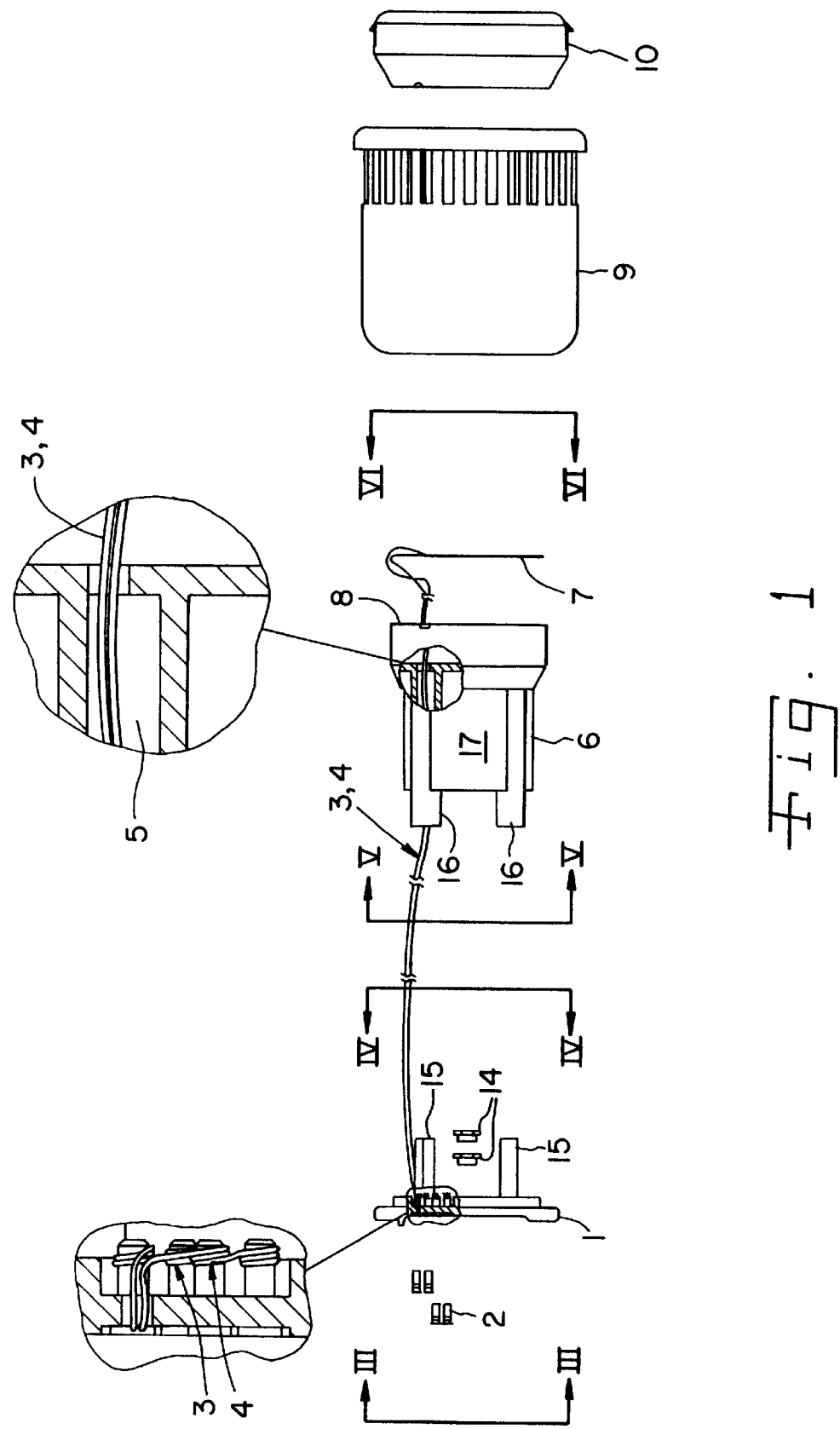
FIG. 1 is an exploded view of the annunciator according to one embodiment of the present invention.

FIG. 1 is an exploded view of an acoustic annunciator according to one embodiment of the present invention. The annunciator includes a base 1 having a bottom in which electrical connection is made by means of connector sockets 2 that are inserted, e.g. press-fit, in the base 1. Connector sockets 2 are designed to receive electrical terminal pins and thus allow the annunciator to be connected to a driving circuit. Wires 3, 4 are attached to the connector sockets 2 on the inside of base 1. As depicted in the enlarged view, the wires 3, 4 can be wrapped around and soldered to the connector ends which extend through base 1. Wires 3, 4 are fed through a channel 5 in main body 6 and connected to the piezoelectric element 7. The piezoelectric element 7 is coupled to the rim 8 of main body 6 by a suitable adhesive. An outer horn 9 is placed over main body 6 and a cap 10 is adhesively bonded to the exposed side of the piezoelectric element 7. The cap 10 both protects the piezoelectric element 7 and retains the outer horn 9 in position about the main body 6.

Figure 2:
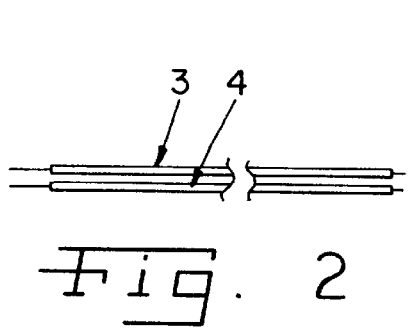
FIG. 2 is a side view of wires which are used to establish electrical connection between connector sockets and the piezoelectric element of the present invention.

FIG. 2 is a side view of wires which are used to establish electrical connection between connector sockets and the piezoelectric element of the present invention. As will be described below in reference to FIGS. 3–6, wires 3, 4 connect to connector sockets 2, loop through the bottom of base 1 and extend through channel 5 in main body 6 and are connected to piezoelectric element 7.

Figure 3:
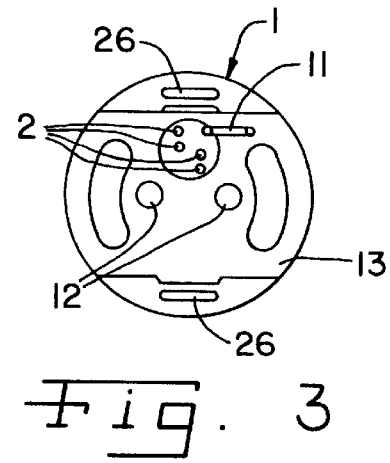
FIG. 3 is a sectional view of the base on the annunciator taken along plane III—III in FIG. 1.

FIG. 3 is a sectional view of the base of the annunciator taken along plane III—III in FIG. 1. FIG. 3 depicts the bottom of base 1 and shows one configuration of connector sockets 2. As depicted, wires 3, 4 which are connected to the ends of connector sockets 2, form a common loop 11 that passes through the bottom of the base 1. The wire loop 11 is aligned so that the wires 3, 4 pass through a channel 5 formed in the main body 6. The base 1 can include one of more through-holes 12. These through-holes 12 can receive mounting posts (not shown) by which the annunciator can be mounted to a collar, housing, or other structure. The base 1 in FIG. 3 includes a recessed portion 13 that is provided to receive a collar therein (also see FIG. 7 or 9).

Figure 4:
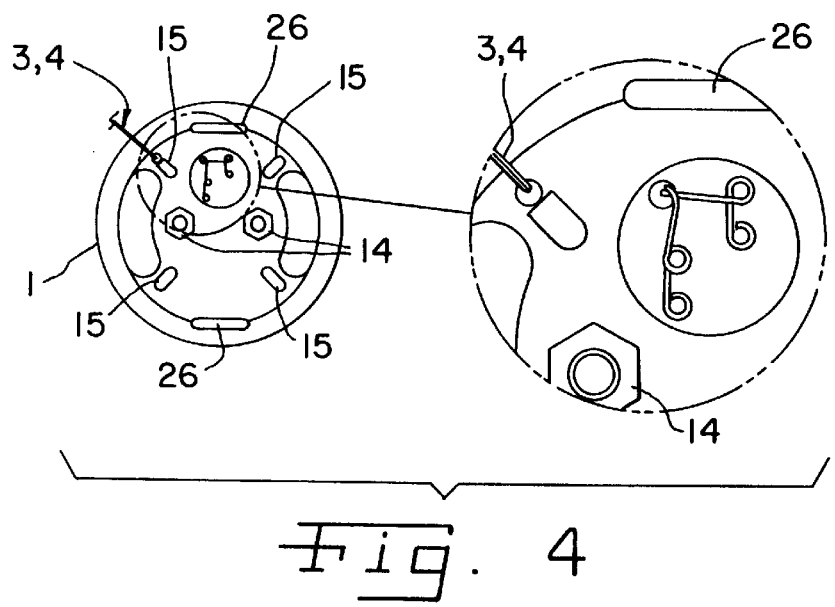
FIG. 4 is a sectional view of the base of the annunciator taken along plane IV—IV in FIG. 1.

FIG. 4 is a sectional view of the base of the annunciator taken along plane IV—IV in FIG. 1. In FIG. 4, threaded fastening members 14 are depicted as being aligned with through-holes 12, as if they were coupled to mounting posts which passed through through-holes 12. The base 1 can be coupled to main body 6 of the annunciator in any convenient manner. As depicted, the base 1 can include one or more projecting structures 15 which are received in complementary shaped receiving structures in the main body 6.

Figure 5:
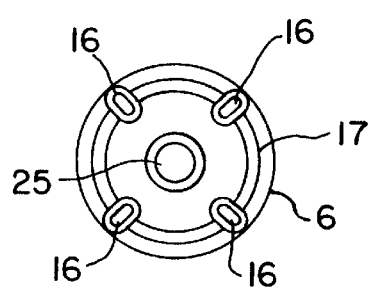
FIG. 5 is a sectional view of the main body of the annunciator taken along plane V—V in FIG. 1.

FIG. 5 is a sectional view of the main body of the annunciator taken along plane V—V in FIG. 1. As shown in FIG. 5, the main body 6 of the annunciator can include a plurality of hollow posts 16 which are adapted to receive projecting structures 15 which extend from the top of the base 1. These hollow posts 16 can be symmetrically arranged in co-axial alignment with a cylindrical cone 17. As discussed below, cone 17 forms part of a folded horn which directs the acoustic signal generated by the piezoelectric element 7 though the annunciator.

Figure 6:
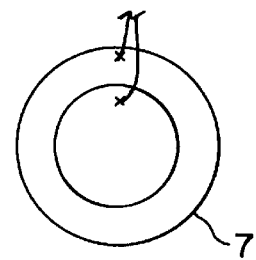
FIG. 6 is a sectional view of the piezoelectric element of the annunciator taken along plane VI—VI in FIG. 1.

FIG. 6 is a sectional view taken along plane VI—VI in FIG. 1 which depicts the piezoelectric element 7. The piezoelectric element 7 can be a conventional bendable piezoelectric element that includes a thin circular membrane made of brass or nickel and a layer of piezoelectric material laminated to the membrane. The wires 3, 4 are used in a known manner to apply an alternating polarity electrical potential across the piezoelectric element 7 and cause the metal membrane to oscillate.

Figure 7:
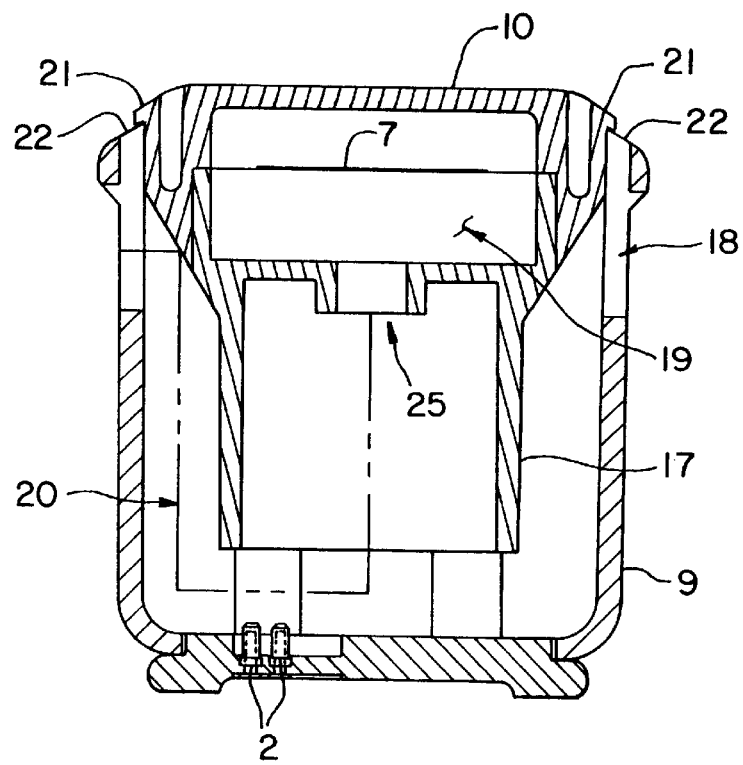
FIG. 7 is a cross-sectional side view of an annunciator according to the present invention.
Figure 9:
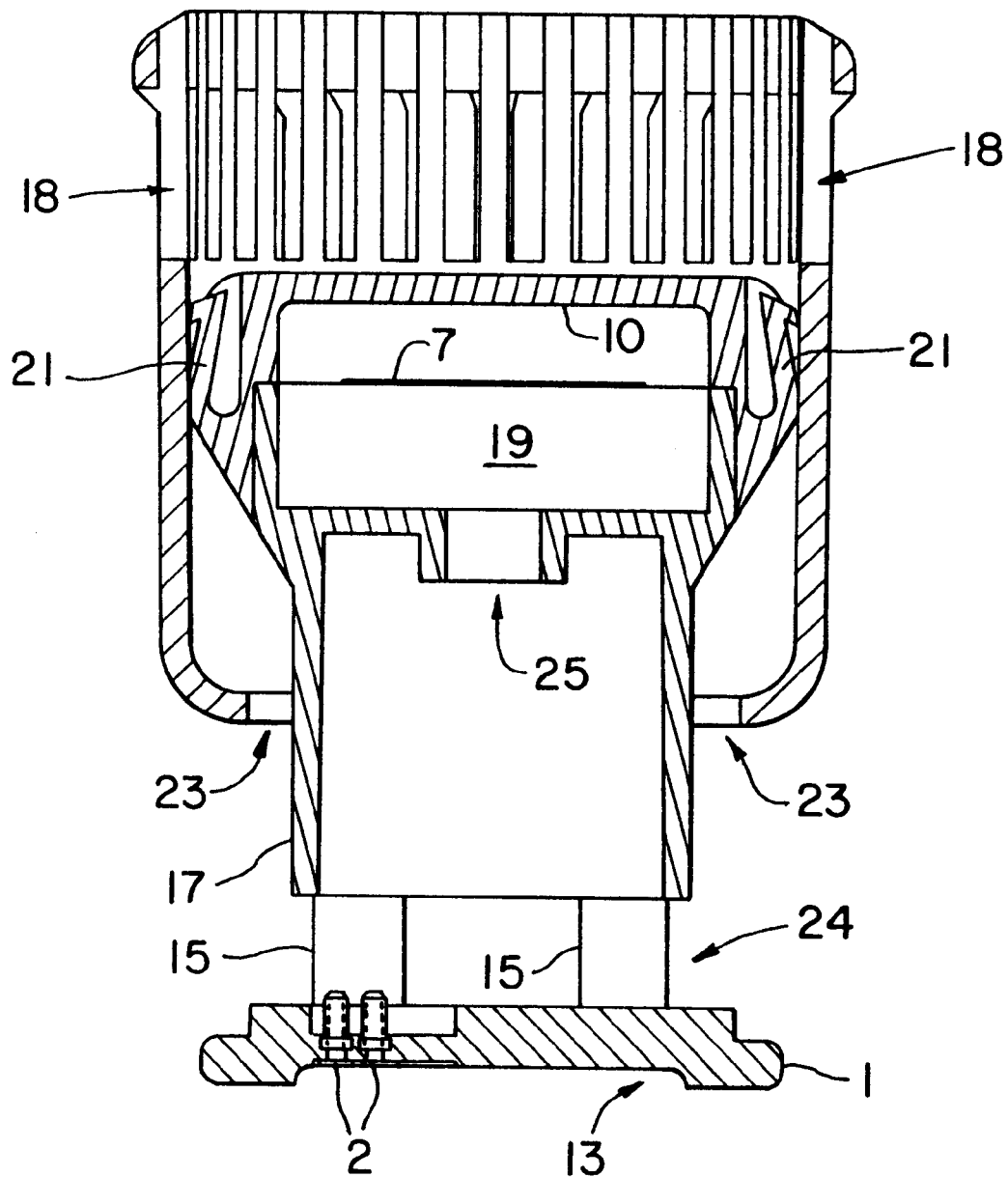
FIG. 9 is a cross-sectional side view of the annunciator of FIG. 7 with the outer horn released from the main body.

FIG. 7 is a cross-sectional side view of an annunciator according to the present invention. FIG. 7 depicts one manner in which the cap 10 can be designed to retain the piezoelectric element 7 at the rim 8 of the main body 6. The outer horn 9 includes a plurality of openings 18 at the top thereof through which audible signals are emitted from the annunciator. The plurality of openings 18 can be arranged to form a grill as depicted in FIGS. 1 and 9. This grill allows audible signals to be emitted from the annunciator while preventing debris, such as twigs, vegetation, soil, etc. from entering the device. As shown, a resonating cavity 19 is formed beneath the piezoelectric element 7. Sound generated by the piezoelectric element 7 in the resonating cavity 19 travels through cone 17 and back through the annular space between cone 17 and outer horn 9 along a pathway indicated by broken line 20.

Figure 8:
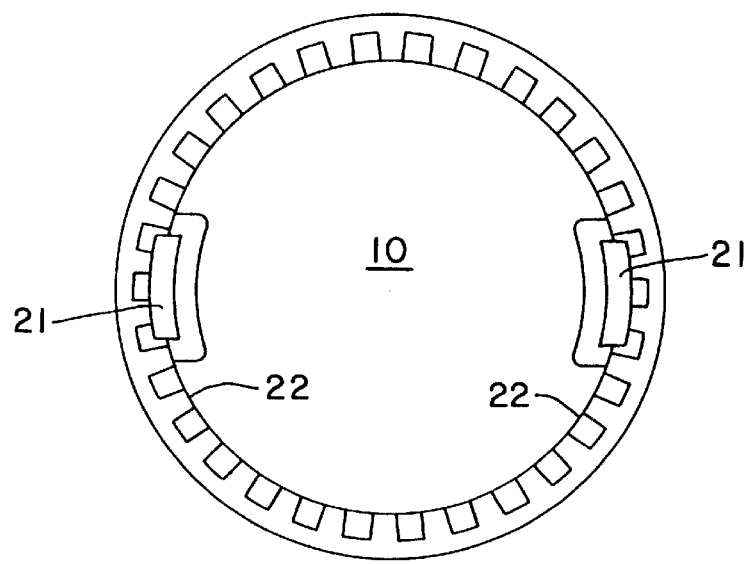
FIG. 8 is a top view of the annunciator of FIG. 7.

FIG. 8 is a top view of the annunciator of FIG. 7. As depicted, cap 10 can include latch elements 21 which, when engaged, restrict axial movement of the outer horn relative to the main body 6 and base 1, while allowing relative rotational movement of the outer horn 9 relative to the main body 6. This relative rotational movement of the outer horn 9 allows the outer horn 9 to rotate when objects such as branches, brush and the like get caught in the grill. As the outer horn 9 rotates, objects that are subject to becoming caught or entangle in the grill can dislodge or be deflected by the movement.

FIG. 9 is a cross-sectional side view of the annunciator of FIG. 7 with the outer horn released from the main body. As shown in FIG. 9, the latch elements 21 include deflectable portions that can be deflected radially inward. These deflectable portions are depicted in their latching position in FIGS. 7 and 8 as engaging the upper rim 22 of the outer horn 9. As depicted in FIG. 9 the deflectable portions of the latching elements 21 can be deflected inward so that the clear the upper rim 22 of the outer horn 9 and allow the outer horn 9 to move axially with respect to the main body 6. Note, the lower portion of the outer horn 9 can be provided with an opening 23 that is large enough in diameter to allow the cone 12 of the main body 6 to freely pass therethrough, but small enough in diameter to prevent an upper outward tapered portion of the main body 6 or cap 10 (or base 1) to pass therethrough. Thus, once the deflectable portions of the latch elements 21 are pushed inward, the outer horn 9 can be pulled away from main body 6 so that the grill can be cleaned of debris. It can also be seen by comparing FIGS. 7 and 9 that the underside of the outer horn 9 can be cleaned of debris through annular opening 24 which is formed when the outer horn 9 is pulled away from base 1. This opening 24 allows access to the area between the top of base 1 and the bottom of cone 17.

The piezoelectric element, resonating cavity, and effective horn length formed by cone 17 and outer horn 9 (and indicated by broken line 20), function collectively to provide the annunciator with a wide dynamic range. In this regard, the resonate frequency of the horn (formed by cone 17 and outer horn 9) should be chosen so that it is lower in frequency than the structural resonate frequency of the piezoelectric element 7. In addition, the resonate frequency of resonating cavity 19 should be tuned so that it is higher than the structural resonate frequency of the piezoelectric element 7. Such a selection or combination of resonate frequencies allows the horn and cavity to reinforce resonances around the central primary resonance of the piezoelectric element 7. As the frequency of the signal diving the piezoelectric element 7 is swept from low to high, an amplitude peak will first be observed at the resonate frequency of the horn, a second peak will be observed at the primary structural resonate frequency of the piezoelectric element 7 and a third peak will occur at the resonate frequency of the resonating cavity 19. These three peaks can be separated sufficiently to produce a high signal amplitude over a 2000 hertz frequency spread.

The annunciator of the present invention can be coupled to a collar and positioned so that the opening 25 from the resonating cavity 19 faces downward when worn by an animal. In this orientation, gravity helps prevent ingress of rain and can assist in providing natural draining in the event the annunciator is submerged. In this regard, drainage openings 26 can be provided in the base 2.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. An acoustic annunciator which includes:
   a housing;
   a piezoelectric element supported in the housing; and
   an outer horn member which surrounds a portion of the housing and is movable with respect to the housing in a manner which does not affect engagement between the outer horn and the housing.

2. An acoustic annunciator according to claim 1, wherein the outer horn member is rotatable about a portion of the housing.

3. An acoustic annunciator according to claim 1, wherein the outer horn is coupled to the housing by a latch member.

4. An acoustic annunciator according to claim 3, wherein the housing comprises a main body and a cap, and the latch member extends from the cap.

5. An acoustic annunciator according to claim 4, wherein the piezoelectric element is positioned between the main body and the cap.

6. An acoustic annunciator according to claim 4, wherein the outer horn member is free to move axially with respect to the housing when the latch member is disengaged.

7. An acoustic annunciator according to claim 6, wherein the axial movement of the outer horn member is limited by an abutting structure formed at the bottom of the outer horn member.

8. An acoustic annunciator according to claim 4, wherein the housing further comprises a base and the main body is coupled to the base by a plurality of posts.

9. An acoustic annunciator according to claim 8, wherein the base is provided with a drain opening.

10. An acoustic annunciator according to claim 8, wherein the main body includes a cone which is spaced apart from the base by the plurality of posts.

11. An acoustic annunciator according to claim 1, further comprising a folded horn structure through which acoustic signals are directed in a serpentine manner.

12. An acoustic annunciator according to claim 11, wherein the resonance frequency of the folded horn is lower than the resonance frequency of the piezoelectric element.

13. An acoustic annunciator according to claim 12, wherein the housing includes a resonating cavity adjacent the piezoelectric and the resonance frequency of the resonating cavity is higher than the resonance frequency of the piezoelectric element.

14. An acoustic annunciator according to claim 1, wherein the outer horn member includes a grill through which acoustic signals are emitted from the annunciator.

15. An acoustic annunciator according to claim 1, wherein the piezoelectric element comprises a disk.

16. An acoustic annunciator according to claim 1 in combination with an animal collar, wherein the annunciator is mounted to the animal collar.

17. In a collar mounted acoustic annunciator which includes a housing and a piezoelectric element supported in the housing, the improvement wherein the housing comprises coaxial housing elements which define a folded horn and wherein one of the coaxial housing elements is rotatable with respect to another one in a manner which does not affect the engagement between the coaxial housing elements.

18. A collar mounted acoustic annunciator according to claim 17, wherein the one coaxial housing element is axially moveable with respect to the other one over a limited distance.

19. A collar mounted acoustic annunciator according to claim 18, wherein the housing includes a base member and wherein axial movement of one of the coaxial housing members causes a gap for removing debris to be formed adjacent the base member.

20. A collar mounted acoustic annunciator according to claim 17, wherein the housing includes a resonating chamber and the resonating chamber, piezoelectric element and folded horn each have a different resonance frequency.

* * * * *